(12) United States Patent
Li et al.

(10) Patent No.: US 7,959,457 B2
(45) Date of Patent: Jun. 14, 2011

(54) BATTERY CONNECTION DEVICE

(75) Inventors: Gechen Li, Hangzhou (CN); Yulin Xu, Hangzhou (CN); Ming Dong, Hangzhou (CN); Xiangzhe Li, Hangzhou (CN); Lewei Zhang, Hangzhou (CN)

(73) Assignee: Cens Energy-Tech Co., Ltd., Hangzhou, Zheijian Province (CN)

( * ) Notice: Subject to any disclaimer, the term of this patent is extended or adjusted under 35 U.S.C. 154(b) by 0 days.

(21) Appl. No.: 12/461,943

(22) Filed: Aug. 28, 2009

(65) Prior Publication Data
US 2010/0105239 A1   Apr. 29, 2010

(30) Foreign Application Priority Data
Sep. 30, 2008  (CN) .......................... 2008 1 0168497

(51) Int. Cl.
*H01R 3/00* (2006.01)
(52) U.S. Cl. ....................................................... 439/500
(58) Field of Classification Search .................. 439/500, 439/626, 627, 366
See application file for complete search history.

(56) References Cited

U.S. PATENT DOCUMENTS

| 4,394,059 A * | 7/1983 | Reynolds ....................... 439/500 |
| 2006/0105624 A1 * | 5/2006 | Yoshikane et al. ............ 439/500 |

* cited by examiner

*Primary Examiner* — Javaid Nasri
(74) *Attorney, Agent, or Firm* — Bacon & Thomas, PLLC (57) ABSTRACT

The invention discloses a battery connection device comprising a connection block positioned at an electrode end of a battery; the connection block is provided with a series connection mechanism at both ends respectively, and with a parallel connection mechanism at all sides respectively; the series connection mechanism is provided inside with a conductive slice electrically connected with the electrode end of the battery; the conductive slice is further led out to a fitting face of the parallel connection mechanism; and thus the conductive slices on the two connection blocks are electrically connected when the two batteries respectively fitted with the connection block are parallel. The invention can make each unit battery connected modularly in series or parallel like a building block; the battery does not further need electrode connection by welding or battery fixing by assembling, which is convenient for operation as well as safe and reliable.

11 Claims, 7 Drawing Sheets

BATTERY CONNECTION DEVICE

FIELD OF THE INVENTION

The invention relates to a battery connection device.

BACKGROUND OF THE INVENTION

A storage battery is a widely used power supply. Multiple unit batteries are generally combined in series or parallel according to voltage and capacity required by load, the voltage being increased through series connection, the capacity being increased through parallel connection. The current method is that, first all the positive electrodes of a certain amount of the unit batteries are connected together through a bus, and then all the negative electrodes together through another bus, thus obtaining a parallel branch. The multiple unit batteries, corresponding to the same position in the parallel branch, are connected according to sequence of the positive electrode and the negative electrode, and thus multiple series branches are obtained. A combination of series connection and parallel connection of the multiple unit batteries can thus be obtained. Therefore, the connection of the bus with the positive electrode and the negative electrode of the battery by welding as well as battery fixing is necessary step for assembling storage batteries or battery sets, with the operation more troublesome and the security not high, either.

CONTENTS OF THE INVENTION

The purpose of the invention is to provide a battery connection device, which can make each unit battery connected modularly in series or parallel like a building block; the battery set obtained from this connection does not further need electrode connection by welding or battery fixing by assembling, which not only is convenient for operation as well as safe and reliable, but also allows arbitrary combination, meeting the voltage and capacity requirements of various storage batteries and battery sets.

A technical solution of the present invention is as below: A battery connection device is provided, which includes a connection block that, made of insulating material, is positioned at an electrode end of a battery; the connection block is provided at both ends with a series connection mechanism, respectively, and at all sides with a parallel connection mechanism, respectively; the series connection mechanism is provided inside with a conductive slice electrically connected with the electrode end of the battery; the conductive slice is further led out to a fitting face of the parallel connection mechanism; and thus the conductive slices on the two connection blocks are electrically connected when the two batteries are parallel which are respectively provided with the connection block.

A further technical solution of the present invention is as below: A battery connection device is provided, which includes a connection block that, made of insulating material, is positioned at an electrode end of a battery; the connection block is provided at both ends with a series connection mechanism, respectively, and at all sides with a parallel connection mechanism, respectively; the series connection mechanism is provided inside with a conductive slice electrically connected with the electrode end of the battery; the conductive slice is further led out to a fitting face of the parallel connection mechanism; thus the conductive slices on the two connection blocks are electrically connected when the two batteries are parallel which are respectively provided with the connection block; the series connection mechanism refers to a first slot and a second slot provided on two head faces of the connection block, the first slot being for the battery to be inserted directly, the second slot being provided inside with the conductive slice; the conductive slice is electrically connected with the battery in the first slot; for series connection, the electrode end of another battery is inserted into the second slot of the conductive slice; the parallel connection device refers to two dovetail grooves and two dovetail blocks positioned at four sides of the connection block; the conductive slice is led out to a fitting face of the dovetail groove or the dovetail block, respectively; and for parallel connection, the several batteries provided likewise with the connection block and the conductive slice are fixed by insertion through the dovetail groove and the dovetail block, and electrically connected with each other through the conductive slice.

A more detailed technical solution of the present invention is as below: A battery connection device is provided, which includes a connection block that, made of insulating material, is positioned at an electrode end of a battery; the connection block is provided at both ends with a series connection mechanism, respectively, and at all sides with a parallel connection mechanism, respectively; the series connection mechanism is provided inside with a conductive slice electrically connected with the electrode end of the battery; the conductive slice is further led out to a fitting face of the parallel connection mechanism; thus the conductive slices on the two connection blocks are electrically connected when the two batteries are parallel which are respectively provided with the connection block; the series connection mechanism refers to a first slot and a second slot provided on two head faces of the connection block, the first slot being for the battery to be inserted directly, the second slot being provided inside with the conductive slice; the conductive slice is electrically connected with the battery in the first slot; for series connection, the electrode end of another battery is inserted into the second slot of the conductive slice; the parallel connection device refers to two dovetail grooves and two dovetail blocks positioned at four sides of the connection block; the conductive slice is led out to a fitting face of the dovetail groove or the dovetail block, respectively; for parallel connection, the several batteries provided likewise with the connection block and the conductive slice are fixed by insertion through the dovetail groove and the dovetail block, and electrically connected with each other through the conductive slice; between the first slot and the second slot is positioned a spacer ring; the spacer ring is integrated with the connection block, and provided at the center with a through hole; the conductive slice is cut out at the center; the cut-out part is provided with two contact slices protruding toward the first slot; the contact slice is connected by welding through the through hole with the battery inserted into the first slot; the connection block is fixed relative to the battery with the help of the spacer ring clipped between the conductive slice and the battery; the conductive slice is provided at the circumference with several clip reeds bended outward; and the battery, inserted into the second slot provided with the conductive slice, is tightly clipped and fixed as well as electrically connected through the clip reed.

In the above technical solutions, between the fitting face of the dovetail groove or the dovetail block and the clip reed is inserted a U-form leading out slice, one pin of which is positioned between side walls of the clip reed and the second slot and electrically connected with the clip reed, while the other pin of which is positioned on the fitting face of the dovetail groove or the dovetail block; for parallel connection, one pin of the U-form leading out slice positioned on the fitting face of the dovetail groove or the dovetail block is electrically connected with the other pin of the U-form leading out slice positioned at another battery; and the two pins of the U-form leading out slice are provided with an elastic slice convex outward, respectively.

The present invention has the following advantages:

1. Making use of the connection block and its conductive slice, the invention can make each unit battery connected modularly in series or parallel like a building block; and the battery set obtained from this connection does not further need electrode connection by welding or battery fixing by assembling.

2. The invention not only is convenient for operation as well as safe and reliable, but also allows arbitrary combination, which can meet the voltage and capacity requirements of various storage batteries and battery sets.

Where:

1. Battery;

2. connection block; 21. first slot; 22. second slot; 23. dovetail slot; 24. dovetail block; 25. spacer ring; 26. through hole;

3. conductive slice; 31. contact slice; 32. clip reed; 33. U-form leading out slice; and 34. elastic slice.

DETAILED DESCRIPTION OF THE EMBODIMENTS

The present invention will further be described below with reference to drawings and embodiments.

Embodiment

Figure 1:
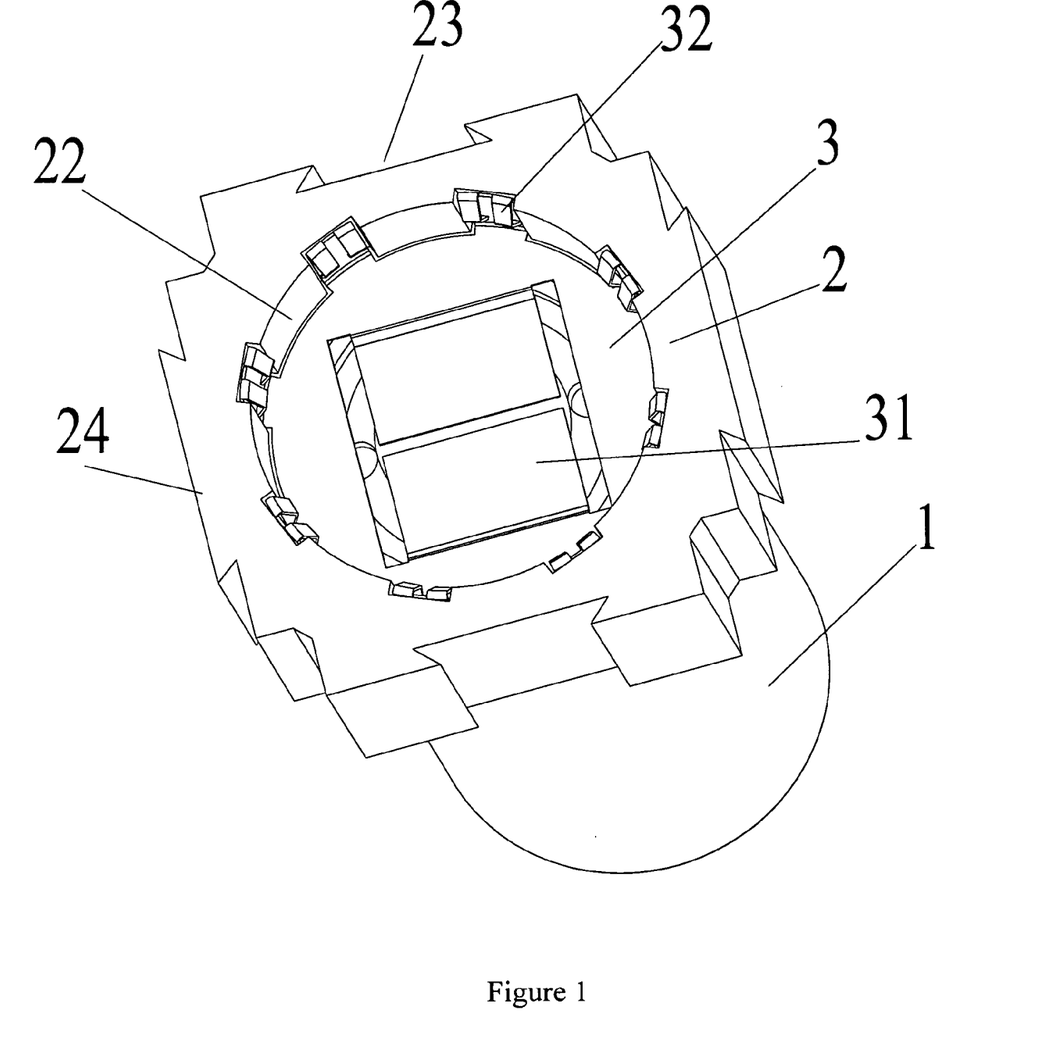
FIG. 1 is a structural schematic view of the invention (the U-form leading out slice is not shown)
Figure 2:
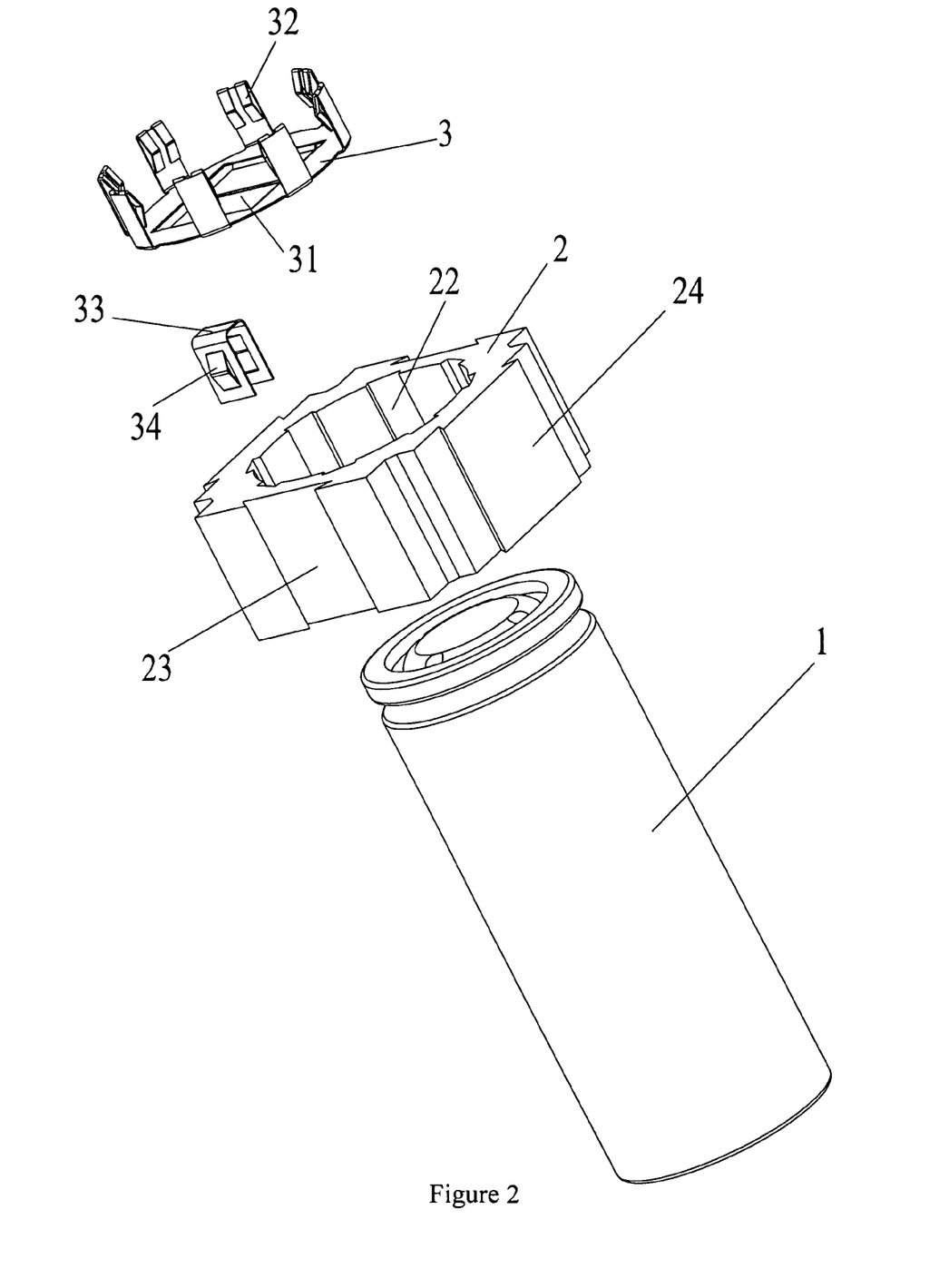
FIG. 2 is an assembly schematic view of the invention (only one U-form leading out slice is shown)
Figure 3:
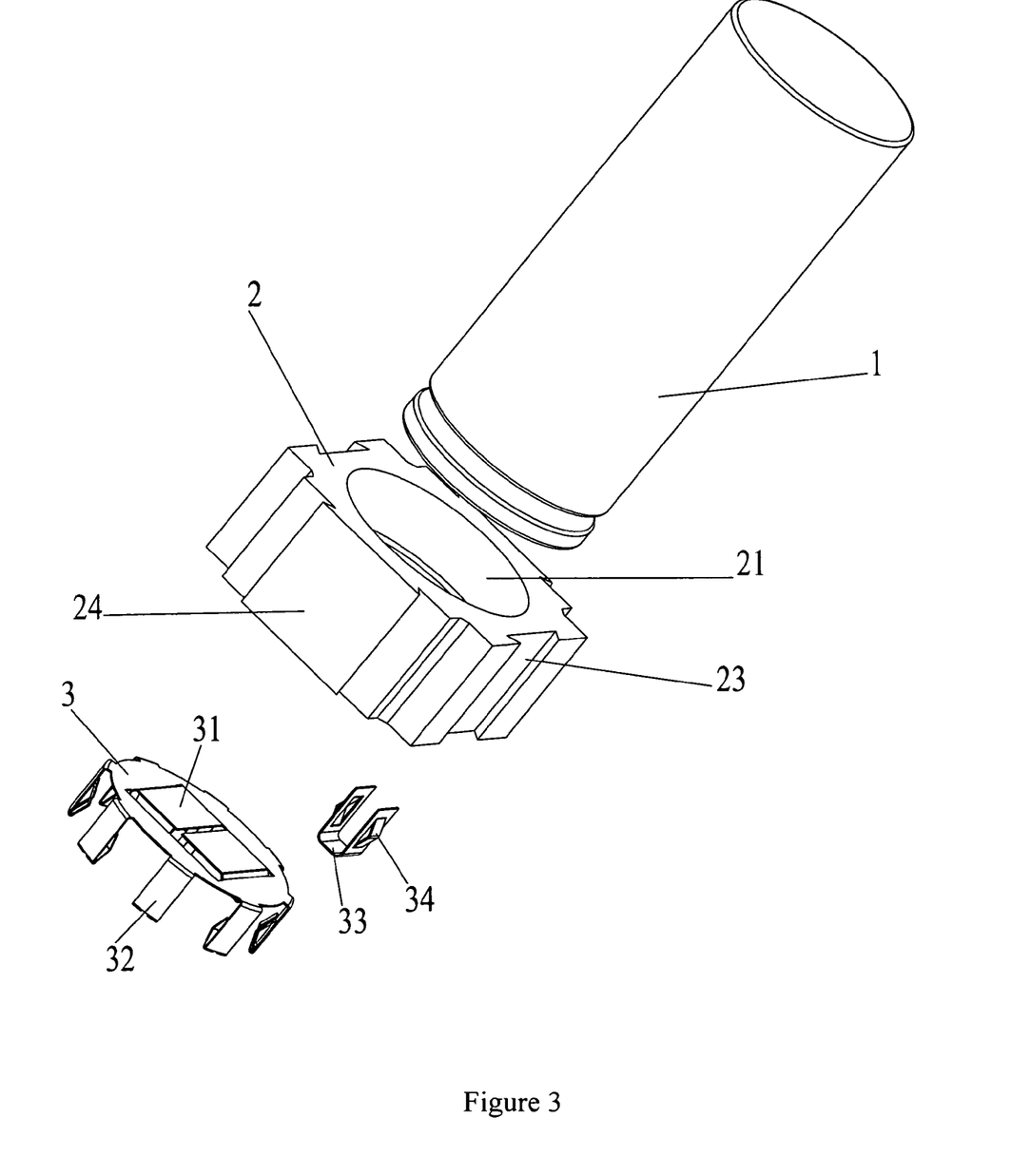
FIG. 3 is another assembly schematic view of the invention (only one U-form leading out slice is shown)
Figure 4:
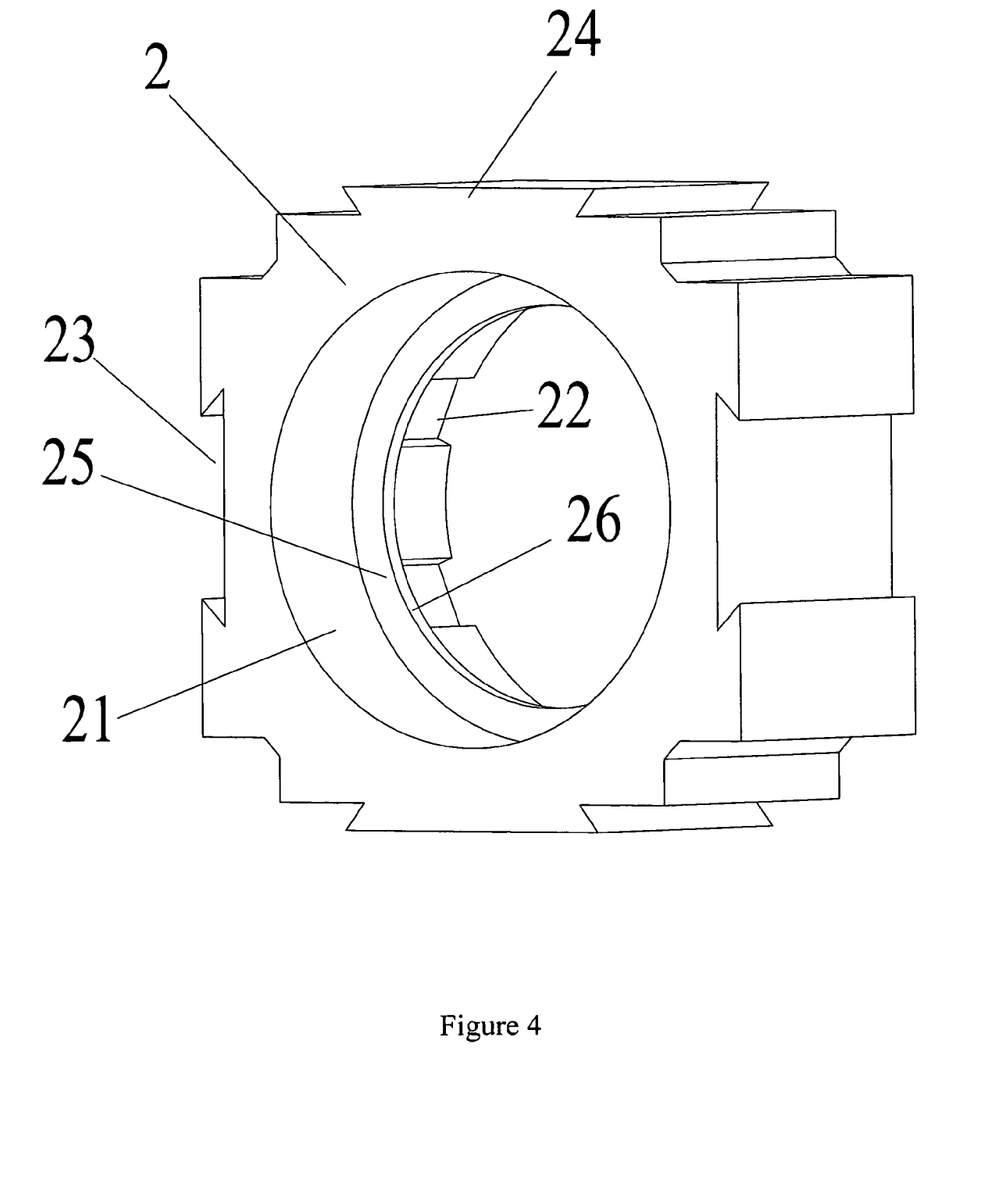
FIG. 4 is a structural schematic view of the connection block of the invention.
Figure 5:
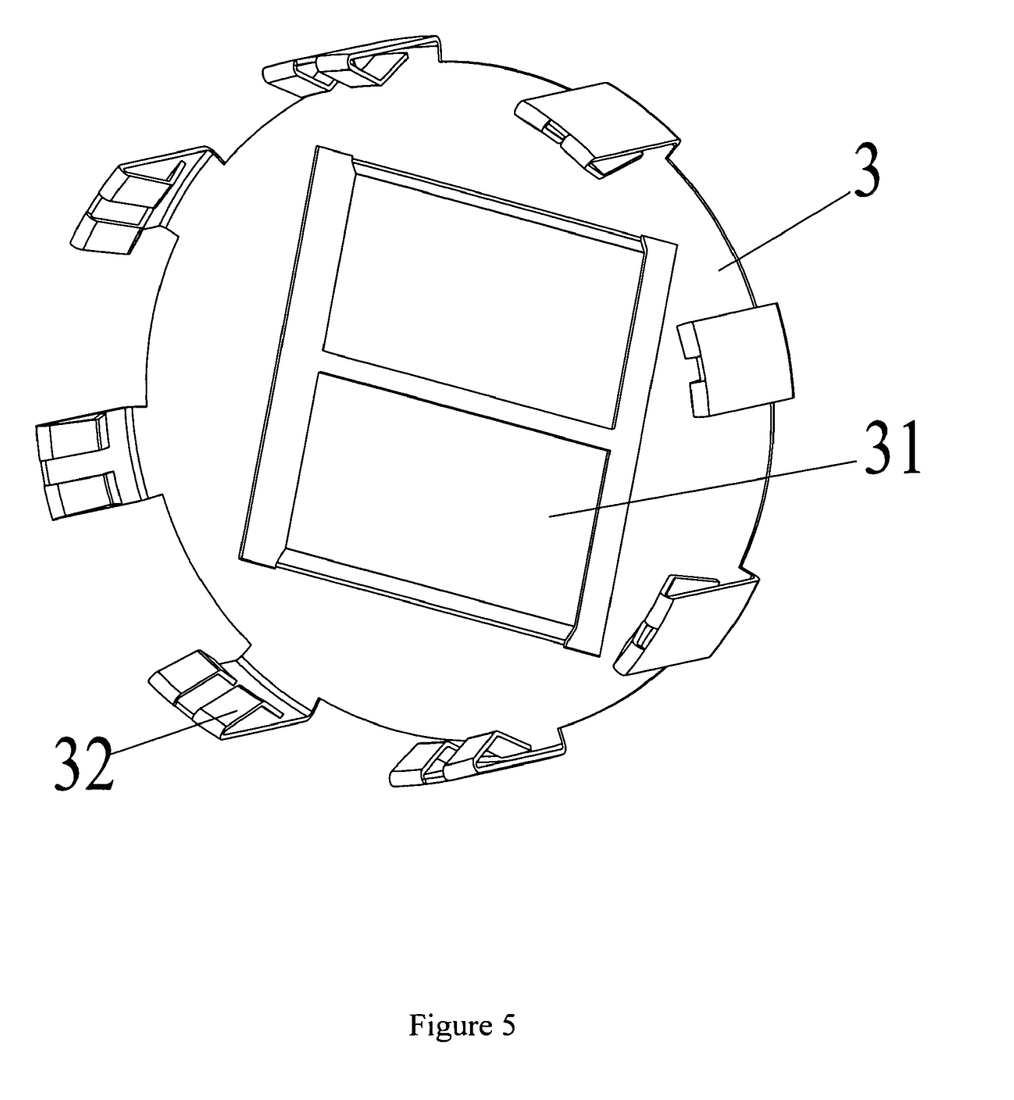
FIG. 5 is a structural schematic view of the conductive slice of the invention.
Figure 6:
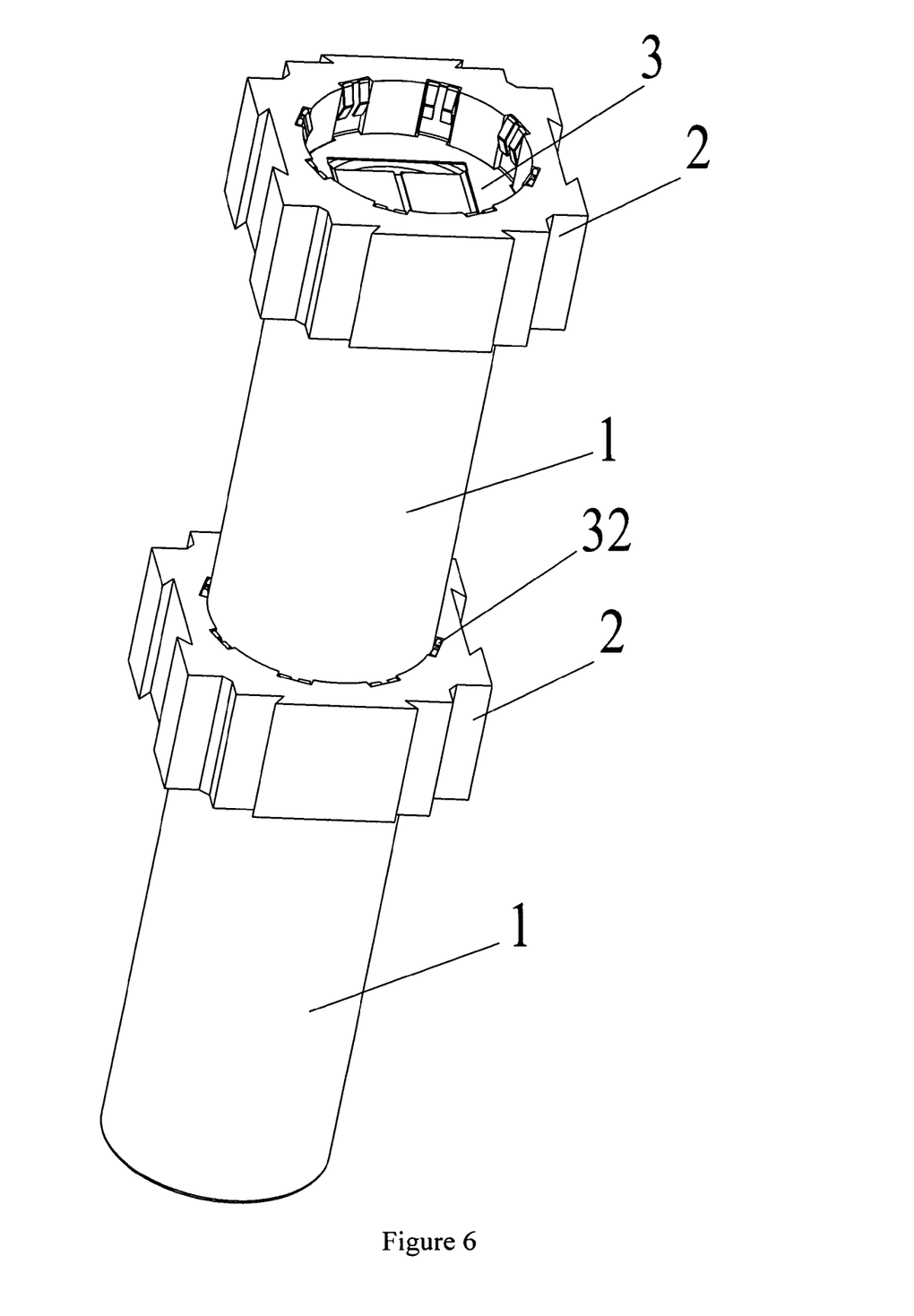
FIG. 6 is a view of two batteries in series connection.
Figure 7:
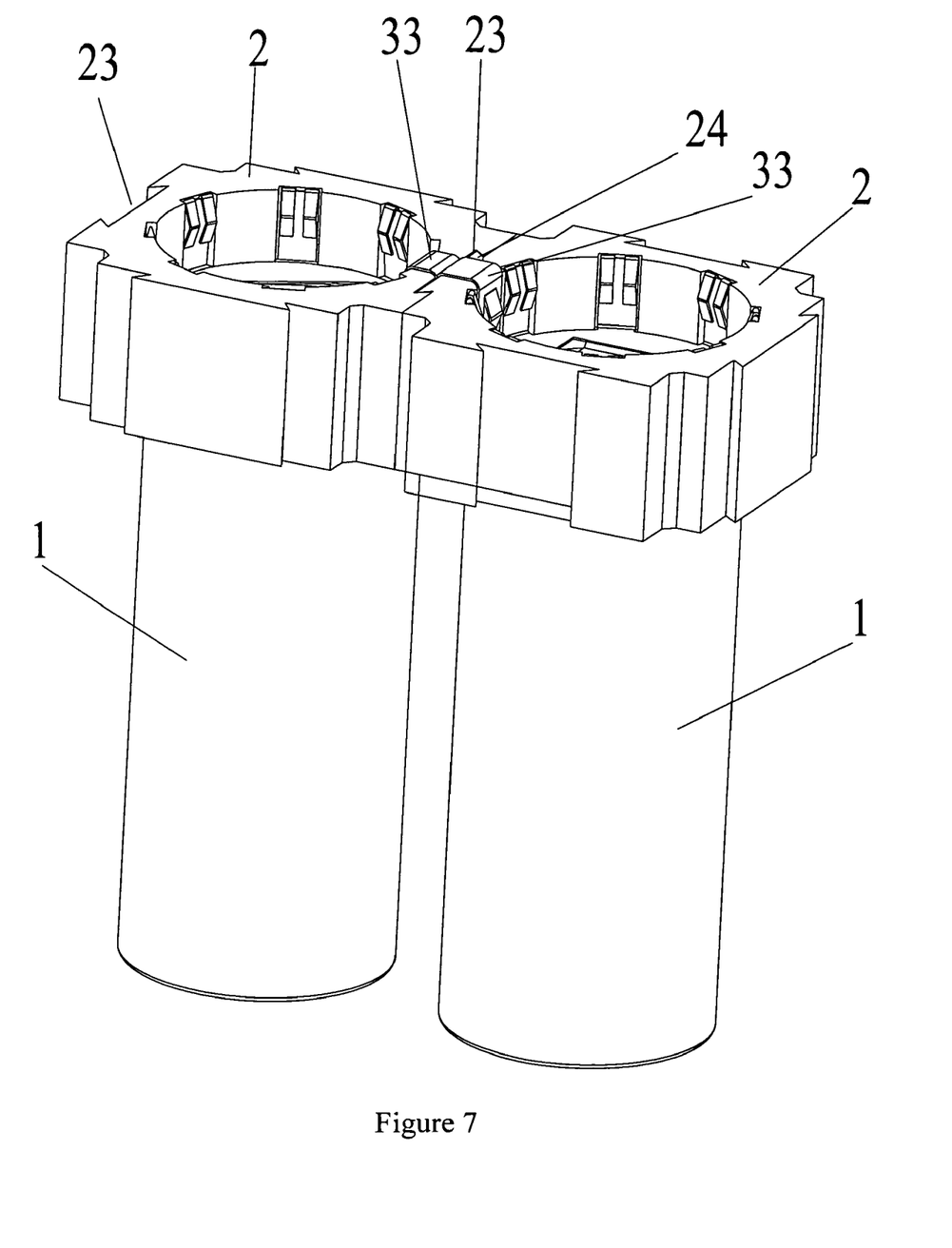
FIG. 7 is a view of two batteries in parallel connection.

As shown in FIG. 1 to FIG. 7, a battery connection device is provided, including a connection block 2 that, made of insulating material, is positioned at an electrode end of a battery 1; the connection block 2 is provided at both ends with a series connection mechanism, respectively, and at all sides with a parallel connection mechanism, respectively;

the parallel connection device refers to two dovetail grooves 23s and two dovetail blocks 24s positioned at four sides of the connection block 2; the series connection mechanism refers to a first slot 21 and a second slot 22 provided on two head faces of the connection block 2, the first slot 21 being for the battery 1 to be inserted directly, the second slot 22 being provided inside with the conductive slice 3; between the first slot 21 and the second slot 22 is positioned a spacer ring 25; the spacer ring 25 is integrated with the connection block 2, and provided at the center with a through hole 26;

the conductive slice 3 is cut out at the center; the cut-out part is provided with two contact slices 31s protruding toward the first slot 21; the contact slice 31 is connected by welding through the through hole 26 with the battery 1 inserted into the first slot 21; the connection block 2 is fixed relative to the battery 1 with the help of the spacer ring 25 clipped between the conductive slice 3 and the battery; the conductive slice 3 is provided at the circumference with several clip reeds 32s bended outward; the battery 1, inserted into the second slot 22 provided with the conductive slice 3, is tightly clipped and fixed as well as electrically connected through the clip reed 32;

between the fitting face of the dovetail groove 23 or the dovetail block 24 and the clip reed 32 is inserted a U-form leading out slice 33, one pin of which is positioned between side walls of the clip reed 32 and the second slot 22 and electrically connected with the clip reed 32, while the other pin of which is positioned on the fitting face of the dovetail groove 23 or the dovetail block 24; the two pins of the U-form leading out slice 33 are provided with an elastic slice 34 convex outward, respectively;

for series connection, the electrode end of the battery 1 is inserted into the second slot 22 with the conductive slice 3, and connected with the battery 1 inserted into the first slot 21 through the clip reed 32, the conductive slice 3, and the contact slice 31; and for parallel connection, the several batteries 1 s provided likewise with the connection block 2 and the conductive slice 3 are fixed by insertion through the dovetail groove 23 and the dovetail block 24; and the two batteries 1s are electrically connected through the elastic slice 34, the U-form leading out slice 33, the clip reed 32, the conductive slice 3, and the contact slice 31.

In this embodiment, the U-form leading out slice 33 is adopted for leading out the conductive slice 3 to the fitting face of the dovetail groove 23 or the dovetail block 24, so as to make the two batteries 1s electrically connected in parallel through the connection block 2. In practice, however, there are still other various designs to realize such an electrical connection when in parallel, which are all within the scope of protection of the invention.

Making use of the connection block 2 and its conductive slice 3, the invention can make each unit battery 1 connected modularly in series or parallel like a building block; and the battery set obtained from this connection does not further need electrode connection by welding or battery fixing by assembling; the invention not only is convenient for operation as well as safe and reliable, but also allows arbitrary combination, which can meet the voltage and capacity requirements of various storage batteries and battery sets.

What is claimed is:

1. A battery connection device, wherein it includes a connection block (2) that, made of insulating material, is positioned at an electrode end of a battery (1), respectively; the connection block (2) is provided with a series connection mechanism at both ends respectively, and with a parallel connection mechanism at all sides respectively; the series connection mechanism is provided inside with a conductive slice (3) electrically connected with the respective electrode end of the battery (1); the conductive slice (3) is further led out to a fitting face of the parallel connection mechanism; and when at least two batteries (1s) respectively fitted with two connection blocks (2) are connected in parallel, the conductive slice (3s) on the connection block (2) of each of the at least two batteries are electrically connected.

2. The battery connection device according to claim 1, wherein the series connection mechanism refers to a first slot (21) and a second slot (22) provided on two head faces of the connection block (2), the first slot (21) being for the battery (1) to be inserted directly, the second slot (22) being provided inside with the conductive slice (3); the conductive slice (3) is electrically connected with the battery (1) in the first slot (21); and for series connection, the electrode end of another battery (1) is inserted into the second slot (22) of the conductive slice (3).

3. The battery connection device according to claim 2, wherein the parallel connection device refers to two dovetail grooves (23s) and two dovetail blocks (24s) positioned respectively at four sides of the connection block (2); the conductive slice (3) is led out to a fitting face of at least one of the two dovetail grooves (23s) or at least one of the two dovetail blocks (24s), respectively; for parallel connection, when several batteries (1s) are provided likewise with the connection block (2), the conductive slice of the connection block on the several batteries (3) are fixed by insertion through at least one of the two dovetail grooves (23s) and at least one of the corresponding dovetail blocks (24s), and electrically connected with each other through the conductive slice (3).

4. The battery connection device according to claim 3, wherein between the first slot (21) and the second slot (22) is positioned a spacer ring (25); the spacer ring (25) is integrated with the connection block (2), and a center of the spacer ring is provided with a through hole (26); the conductive slice (3) is cut out at the center of the conductive slice (3); the cut-out part of the conductive slice (3) is provided with at least two contact slices (31s) protruding toward the first slot (21); the at least two contact slices (31s) are connected by welding through the through hole (26) with the battery (1) inserted into the first slot (21); and the connection block (2) is fixed relative to the battery (1) with the help of the spacer ring (25) clipped between the conductive slice (3) and the battery (1).

5. The battery connection device according to claim 4, wherein the conductive slice (3) is provided at the circumference with several clip reeds (32s) bended outward; and the battery (1), inserted into the second slot (22) provided with the conductive slice (3), is tightly clipped and fixed as well as electrically connected through one of the several clip reeds (32s).

6. The battery connection device according to claim 5, wherein between the fitting face of at least one of the two dovetail grooves (23s) or at least one of the two dovetail blocks (24s) and one of the several clip reeds (32s) is inserted a U-form leading out slice (33), having a first pin of which is positioned between side walls of one of the several clip reeds (32s) and the second slot (22) and electrically connected with one of the several clip reeds (32s), while a second pin of which is positioned on the fitting face of one of the two dovetail grooves (32s) or one of the two dovetail blocks (24s); and for parallel connection, at least one of the first and second pin of the U-form leading out slice (33) positioned on the fitting face of one of the two dovetail grooves (23s) or one of the two dovetail blocks (24s) is electrically connected with at least a first or second pin of the U-form leading out slice (33) positioned at another connection block (2).

7. The battery connection device according to claim 6, wherein the first and second pins of the U-form leading out slice (33) are provided with an elastic slice (34) convex outward, respectively.

8. The battery connection device according to claim 2, wherein between the first slot (21) and the second slot (22) is positioned a spacer ring (25); the spacer ring (25) is integrated with the connection block (2), and a center of the spacer ring is provided with a through hole (26); the conductive slice (3) is cut out at a center of the conductive slice (3); the cut-out part of the conductive slice (3) is provided with at least two contact slices (31s) protruding toward the first slot (21); the at least two contact slices (31s) are connected by welding through the through hole (26) with the battery (1) inserted into the first slot (21); and the connection block (2) is fixed relative to the battery (1) with the help of the spacer ring (25) clipped between the conductive slice (3) and the battery (1).

9. The battery connection device according to claim 8, wherein the conductive slice (3) is provided a circumference with several clip reeds (32s) bended outward; and the battery (1), inserted into the second slot (22) provided with the conductive slice (3), is tightly clipped and fixed as well as electrically connected through at least one of the several clip reeds (32s).

10. The battery connection device according to claim 9, wherein between the fitting face of a dovetail groove (23) or a dovetail block (24) and at least one of the several clip reeds (32) is inserted a U-form leading out slice (33), having a first pin of which is positioned between side walls of one of the several clip reeds (32s) and the second slot (22) and electrically connected with one of the several clip reeds (32s), while a second pin of which is positioned on the fitting face of the dovetail groove (23) or the dovetail block (24); and for parallel connection, at least one of the first or second pins of the U-form leading out slice (33) positioned on the fitting face of the dovetail groove (23) or the dovetail block (24) is electrically connected with at least one of a first or second pin of the U-form leading out slice (33) positioned at another connection block (2).

11. The battery connection device according to claim 10, wherein the the first and second pins of the U-form leading out slice (33) are provided with an elastic slice (34) convex outward, respectively.

* * * * *